(12) United States Patent
Nguyen

(10) Patent No.: US 10,724,958 B2
(45) Date of Patent: Jul. 28, 2020

(54) IMAGING DEVICES, IMAGING ARRANGEMENTS, AND IMAGING METHODS

(71) Applicant: Sensors Unlimited, Inc., Princeton, NJ (US)

(72) Inventor: Thuc-Uyen Nguyen, Princeton, NJ (US)

(73) Assignee: Senors Unlimited, Inc., Princeton, NJ (US)

( * ) Notice: Subject to any disclaimer, the term of this patent is extended or adjusted under 35 U.S.C. 154(b) by 59 days.

(21) Appl. No.: 15/804,460

(22) Filed: Nov. 6, 2017

(65) Prior Publication Data

US 2019/0137400 A1    May 9, 2019

(51) Int. Cl.
| | |
|---|---|
| *G01N 21/64* | (2006.01) |
| *G02B 21/16* | (2006.01) |
| *G02B 21/08* | (2006.01) |
| *G02B 21/06* | (2006.01) |
| *G02B 26/00* | (2006.01) |

(52) U.S. Cl.
CPC ......... *G01N 21/6458* (2013.01); *G02B 21/06* (2013.01); *G02B 21/084* (2013.01); *G02B 21/16* (2013.01); *G01N 2021/6471* (2013.01); *G02B 26/001* (2013.01)

(58) Field of Classification Search
CPC ....... G01N 21/6458; G01N 2021/6471; G02B 21/06; G02B 21/16; G02B 21/084; G02B 26/001

USPC .......................................... 250/459.1, 458.1
See application file for complete search history.

(56) References Cited

U.S. PATENT DOCUMENTS

| | | | |
|---|---|---|---|
| 5,834,203 | A | 11/1998 | Katzir et al. |
| 7,990,611 | B2 | 8/2011 | Betzig |
| 9,080,978 | B2 | 7/2015 | Christiansen et al. |
| 9,645,291 | B1 | 5/2017 | Sommer et al. |
| 2009/0309967 | A1* | 12/2009 | Kim ........................ G01N 21/94 348/143 |
| 2018/0168492 | A1* | 6/2018 | Vermeulen ........... A61B 5/7214 |

FOREIGN PATENT DOCUMENTS

WO    WO-2011072401 A1    6/2011

OTHER PUBLICATIONS

Extended European Search Report for European Patent Application No. EP18204493.3, dated Mar. 29, 2019.

* cited by examiner

*Primary Examiner* — David P Porta
*Assistant Examiner* — Gisselle M Gutierrez
(74) *Attorney, Agent, or Firm* — Locke Lord LLP; Scott D. Wofsy; Judy R. Naamat

(57) ABSTRACT

An imaging device includes a camera and an illuminator. The illuminator is positioned and configured to illuminate an article through an illuminator tunable filter disposed along an optical axis and capture an image of the article through a camera tunable filter arranged along the optical axis. Imaging arrangements and imaging methods are also described.

18 Claims, 5 Drawing Sheets

IMAGING DEVICES, IMAGING ARRANGEMENTS, AND IMAGING METHODS

BACKGROUND OF THE INVENTION

1. Field of the Invention

The present disclosure relates to imaging, and more particularly to imaging devices and imaging arrangements that generate imagery using light emitted by excited fluorophores.

2. Description of Related Art

Fluoroscopic microscopes are commonly used to for inspecting relatively fine structures, such as vascular structure within a tissue sample, with the aid of a fluorescent dye. The structure to be inspected is typically infused with the fluorescent dye and illuminated with excitation light. The excitation light provokes a fluorescent response from the fluorescent dye, which the microscope collects to create an image of the structure. Because the some of the light emitted by the fluorescent dye is attenuated by the structure within which it is infused, the resulting image can provide information about the structure generally unavailable using other imaging techniques.

Fluoroscopic microscopes generally have three-arm arrangements. Three-arm arrangements include a source arm that intersects coaxial excitation and imaging arms at a dichroic mirror. The dichroic mirror redirects light from the source arm along the excitation arm to the dyed structure, which fluoresces in response to the light received from the source arm, and which the dichroic mirror transmits from the excitation arm to the imaging arm for generation of imagery of the dyed structure. Filters, selected to match the characteristics of the dye used for the article being inspected, are typically arranged along excitation and imaging arms such that the light source and fluorescent light cooperate with wavelength selectivity of the dichroic mirror.

Such conventional methods and systems have generally been considered satisfactory for their intended purpose. However, there is still a need in the art for improved imaging devices, arrangements, and methods. The present disclosure provides a solution for this need.

SUMMARY OF THE INVENTION

An imaging device includes a camera and an illuminator. The illuminator is positioned and configured to illuminate an article through an illuminator tunable filter disposed along an optical axis and capture an image of the article through a camera tunable filter arranged along the optical axis.

In certain embodiments, the illuminator tunable filter and the camera tunable filter can be coplanar with one another One of the illuminator tunable filter and camera tunable filter can perimetrically surrounds the other of the illuminator tunable filter and camera tunable filter. One of the illuminator tunable filter and camera tunable filter can have a two or more filter elements. The imaging device can have no dichroic mirror.

In accordance with certain embodiments the imaging device can include a lead. The lead can be electrically connected to one of the illumination tunable filter and the camera tunable filter. At least one of the illuminator tunable filter and the camera tunable filter can transmit light with wavelength in the first bandpass upon receipt of a first voltage and transmit light with wavelength in the second bandpass upon receipt of a second voltage. The second bandpass include wavelengths not in the first bandpass. It is contemplated that a controller can be connected to the illuminator tunable filter and/or the camera tunable filter to second the bandpass of the respective filter without uncoupling the filter from the optical axis.

It is also contemplated that, in accordance with certain embodiment, a voltage source can be electrically connected to the illuminator tunable filter and/or the camera tunable filter. The imaging device can include a camera tunable filter lead. The camera tunable filter lead can be electrically connected to the camera tunable filter and electrically isolated from the illuminator tunable filter. The imaging device can have a stage disposed along the optical axis. The stage can have thereon an article containing a fluorophore optically coupled to at least one of the illuminator tunable filter and camera tunable filter.

An imaging arrangement includes an imaging device as described above. An ocular lens is disposed along the optical axis, an objective lens optically coupled to the ocular lens by the optical axis, and a tunable filter arrangement including the illuminator tunable filter arrangement and the camera tunable filter is disposed along the optical axis between the ocular lens and the objective lens. The tunable filter arrangement has a first bandpass and at least one second bandpass to image an article containing a fluorophore with the camera and illuminator without an intervening dichroic mirror.

In certain embodiments, the camera can be optically coupled to the ocular lens by the illuminator tunable filter. The illuminator can be optically coupled to the ocular lens by the tunable filter arrangement. The camera tunable filter can coplanar with the illuminator tunable filter, a first lead can be electrically connected to the illuminator tunable filter, and a second lead can be electrically connected to the camera tunable filter, the second lead electrically isolated from the illuminator tunable filter for coincidently applying different voltages to the illuminator tunable filter and camera tunable filter.

An imaging method includes tuning the illuminator tunable filter to a first illuminator bandpass and tuning the camera illuminator tunable filter to a first camera bandpass. A fluorophore is excited using light from within first illuminator bandpass and an article containing the fluorophore imaged using light within the first camera bandpass.

In certain embodiment the method can include tuning the illuminator tunable filter to a second illuminator bandpass without optically uncoupling the illuminator tunable filter from the optical axis. The article containing the fluorophore can then again be imaged using light within the first camera bandpass.

In accordance with certain embodiments, the method can include tuning the camera tunable filter to a second camera bandpass without optically uncoupling the camera tunable filter from the optical axis. The article containing the fluorophore can then again be imaged using light within the second camera bandpass.

It is also contemplated that, in accordance with certain embodiments, the method can include tuning the illuminator tunable filter to a second illuminator bandpass without optically uncoupling the illuminator tunable filter from the optical axis and tuning the camera tunable filter to a second camera bandpass without optically uncoupling the camera tunable filter from the optical axis. The article containing the fluorophore can then again be imaged using light within the second camera bandpass.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
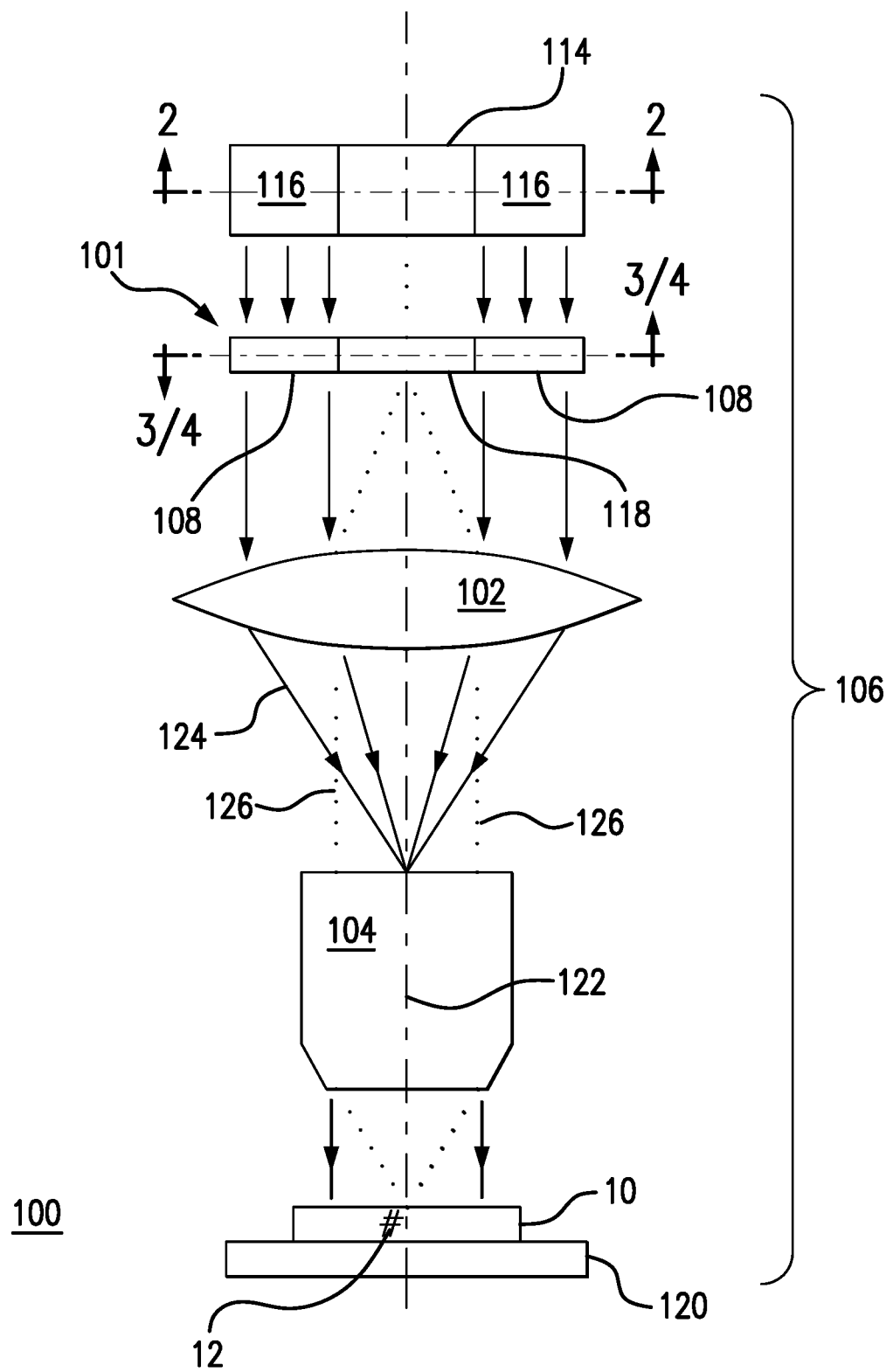
FIG. 1 is a cross-sectional view of an imaging device constructed in accordance with the present disclosure, schematically showing an illuminator, a camera and tunable filter arrangement including an illuminator tunable filter and a camera tunable filter.

Reference will now be made to the drawings wherein like reference numerals identify similar structural features or aspects of the subject disclosure. For purposes of explanation and illustration, and not limitation, a partial view of an exemplary embodiment of an imaging device in accordance with the disclosure is shown in FIG. 1 and is designated generally by reference character 100. Other embodiments of imaging devices, imaging arrangements, and imaging methods in accordance with the disclosure, or aspects thereof, are provided in FIGS. 2-6, as will be described. The systems and methods described herein can be used in fluoroscopic imaging, such as in fluoroscopic microscopy, though the present disclosure is not limited to microscopy or to fluoroscopic imaging in general.

Referring to FIG., 1, imaging device 100 is shown. Imaging device 100 includes an ocular lens 102 disposed along an optical axis 122, an objective lens 104 optically coupled to ocular lens 102 by optical axis 122, and a tunable filter arrangement 101. Tunable filter arrangement 101 includes an illuminator tunable filter 108 and a camera tunable filter 118, and is optically coupled to ocular lens 102 and objective lens 104 by optical axis 122. Tunable filter arrangement 101 and has a first bandpass, e.g., a first illuminator filter bandpass 110 (shown in FIG. 3) and a first camera filter bandpass 128 (shown in FIG. 3), and a second illuminator filter bandpass, e.g., a second illuminator filter bandpass 112 (shown in FIG. 4) or a second camera filter bandpass 130 (shown in FIG. 4), to image an article 10 containing a fluorophore 12 with a camera 114 and an illuminator 116 without an intervening dichroic mirror.

Optical axis 122 extends between a stage 120 positioned on one end of optical axis 122 and a camera 114 and an illuminator 116 positioned at a common axial on an opposite end of optical axis 122. Camera 114, illuminator tunable filter 108, camera tunable filter 118, ocular lens 102, and objective lens 104 are each disposed along optical axis 122. Stage 120 carries article 10 containing a fluorophore 12, is optically coupled to illuminator 116 by an optical coupling 124, and is optically coupled to camera 114 by optical coupling 126.

Optical coupling 124 extends between illuminator 116 and stage 120 along optical axis 122, optical coupling 124 thereby optically coupling illuminator 116 to ocular lens 102 through illuminator tunable filter 108. More particularly, illuminator 116, illuminator tunable filter 108, ocular lens 102, objective lens 104, and stage 120 are each disposed along optical axis 122 and optically coupled to one another by optical coupling 124. Optical coupling 124 in turn conveys excitation light with wavelengths within first illuminator filter bandpass 110 (shown in FIG. 3) or second illuminator filter bandpass 112 (shown in FIG. 4), generated by illuminator 116, through illuminator filter to stage 120, and thereby to fluorophore 12 carried thereon.

Optical coupling 126 extends between stage 120 and camera 114 along optical axis 122, optical coupling 126 thereby optically coupling ocular lens 102 to camera 114 through camera tunable filter 118. More particularly, stage 120, objective lens 104, ocular lens 102 and camera tunable filter 118 are each disposed along optical axis 122 and optically coupled to one another by optical coupling 126. Optical coupling 126 conveys light within a first camera filter bandpass, e.g., first camera filter bandpass 128 (shown in FIG. 3) or second camera filter bandpass 130 (shown in FIG. 4), emitted by fluorophore 12, and transmitted through objective lens 104, ocular lens 102, and camera tunable filter 118, to camera 114.

Camera 114 can be any type of image capture device. For example, camera 114 can include a photodiode array arranged to generate image data from fluorescence emitted by fluorophore 12. In certain embodiments camera 114 can include a film-type camera arranged to generate image data from fluorescence emitted by fluorophore 12. In accordance with certain embodiments, camera 114 can include presentation window for real-time viewing by a user or imagery generated from fluorescence emitted by fluorophore 12.

In the illustrated exemplary embodiment imaging device 100 has a two-arm arrangement 106. As used herein, the term "two-arm arrangement" refers to an imaging apparatus having a camera and an illuminator arranged at common axial position along an optical axis. In the illustrated exemplary embodiment imaging device 100 includes tunable filter arrangement 101, which enables placement of camera 114 and illuminator 116 at a common axial location along optical axis 122, thereby allowing imaging device 100 to have a two-arm arrangement.

As will be appreciated by those of skill in the art in view of the present disclosure, a two-arm arrangement can simplify the optical architecture of a fluoroscopic imaging device, e.g., imaging device 100, by eliminating the need for a dichroic mirror. More particularly, as the illuminator and camera can be arranges on opposite sides of the optical axis from both the camera lens group and objective lens group, e.g., ocular lens 102 and objective lens 104, there is no need to selectively redirect light along an optical axis from an off-axis illuminator while transmitting light along the optical axis using a dichroic mirror. Elimination of the dichroic mirror can reduce the size, cost and complexity of imaging device 100 compared to imaging devices employing dichroic mirrors and having three-arm arrangements.

Figure 2:
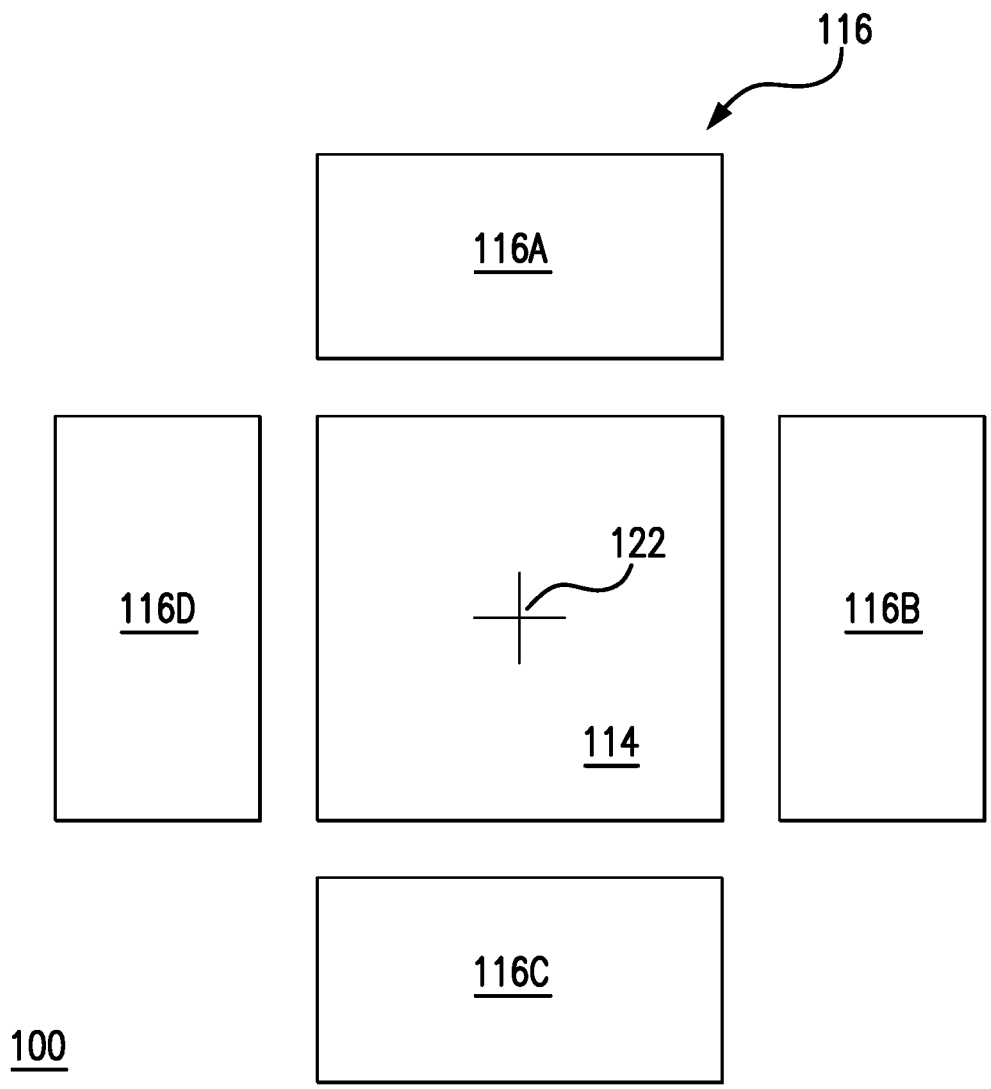
FIG. 2 is a cross-sectional view of the illuminator and camera of FIG. 1, showing the illuminator and camera disposed along the optical axis at a common axial position.

With reference to FIG. 2, camera 114 and illuminator 116 are shown. Camera 114 is disposed along optical axis 122 such that optical axis 122 intersects camera 114. Illuminator 116 is arranged perimetrically about camera 114 and radially outward thereof. The illustrated perimetrical arrangement of illuminator 116 about camera 114 allows for use illuminator tunable filter 108 (shown in FIG. 1) and camera tunable filter 118 (shown in FIG. 1) in a coplanar arrangement, i.e., arranged on a plane that is orthogonal optical axis 122, thereby providing a compact optical architecture of imaging device 100. As will be appreciated by those of skill in the art in view of the present disclosure, in accordance with certain embodiments, illuminator 116 can disposed along optical axis 122 such that optical axis 122 intersects illuminator 116, camera 114 can being in a perimetrical arrangement extending about illuminator 116.

In the illustrated exemplary embodiment illuminator 116 is segmented into four (4) segments, i.e., illuminator segments 116A-116D, to accommodate the illustrated radially outward arrangement. This is for illustration purposes only and is non-limiting. It is contemplated that illuminator 116 can include fewer than four or more than four illuminator segments, as suitable for an intended application. Similarly, in embodiments having camera 114 arranged perimetrically about illuminator 116, camera 114 can have four (4) segments, fewer than four (4) segments, or more than four (4) segments, as suitable for an intended application.

Figure 3:
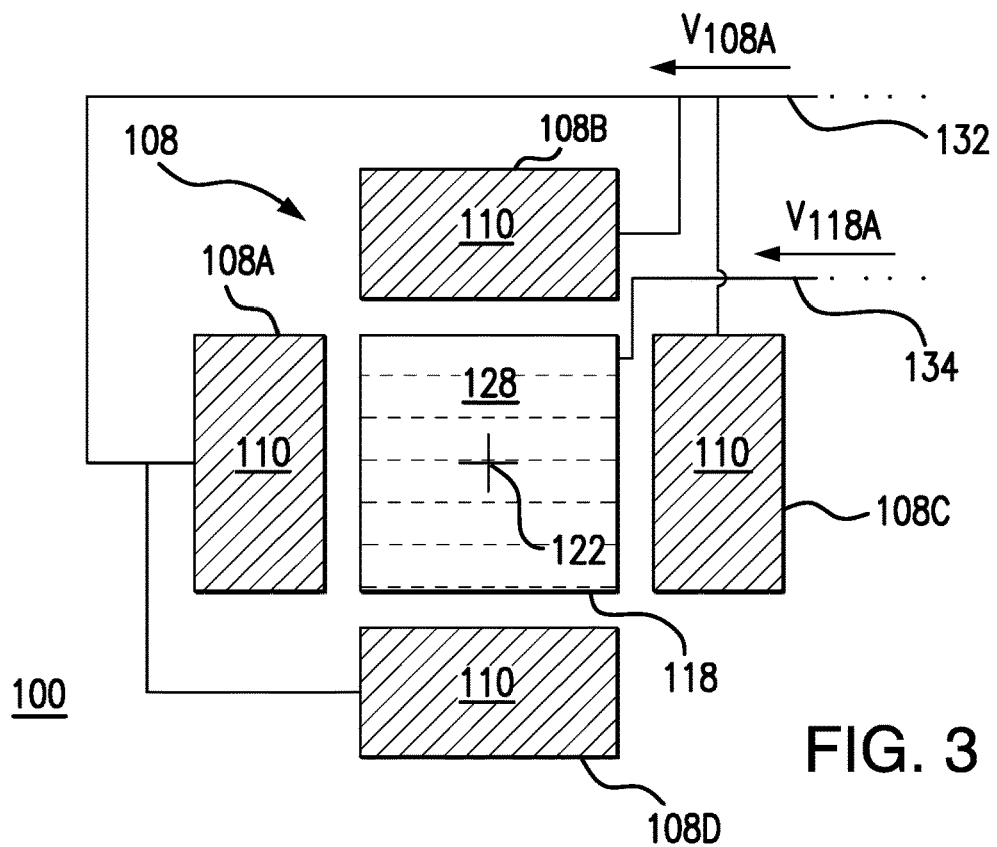
FIG. 3 is a cross-sectional view of the tunable filter arrangement of FIG. 1, showing the camera tunable filter and an illuminator tunable filter disposed along the optical axis at a common axial position and voltages being applied to each such that the illuminator tunable filter and the camera tunable filter each have a selected bandpass.
Figure 4:
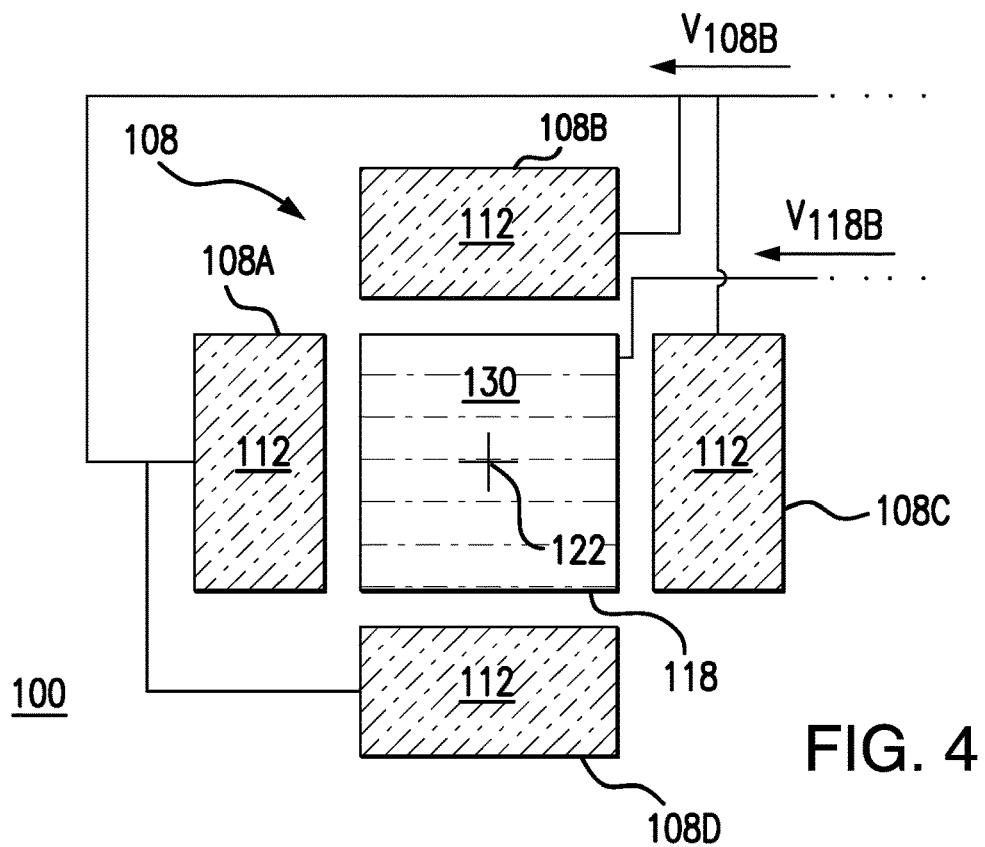
FIG. 4 is a cross-sectional view of the tunable filter arrangement of FIG. 1, showing different voltages from those shown in FIG. 3 being applied to the illuminator tunable filter and the camera tunable filter such that each have a bandpass different than that shown in FIG. 3.

With reference to FIGS. 3 and 4, illuminator tunable filter 108 and camera tunable filter 118 are shown. Referring to FIG. 3, illuminator tunable filter 108 is configured to transmit light with wavelengths within first illuminator filter bandpass 110 upon receipt of a first illuminator filter voltage $V_{108A}$. In particular, it is contemplated that, responsive to selection of the magnitude of first illuminator filter voltage $V_{108A}$, excitation illumination communicated to fluorophore 12 (shown in FIG. 1) can be selected (i.e. tuned) to provide fluorescence suitable for viewing structure of interest within article 10 (shown in FIG. 1). As the magnitude of first illuminator filter voltage $V_{108A}$ can be adjusted, and first illuminator filter bandpass 110 thereby changed, without replacing (and/or changing the physical location) of illuminator tunable filter 108 relative to optical axis 122, the wavelength of excitation illumination transmitted to fluorophore 12 can be changed relatively quickly compared to imaging devices with movable filters, simplifying imaging. Examples of suitable tunable filters for tunable illumination filter 108 include MEMS-based devices having tunable cavity resonators such as those described in U.S. Pat. No. 8,003,427 to Faraone et al., issued on Aug. 23, 2011, the contents of which is incorporated herein by reference in its entirety.

Illuminator tunable filter 108 and illuminator 116 are in registration with one another at locations radially offset from optical axis 122. In the illustrated exemplary embodiments, illuminator tunable filter 108 includes a plurality of tunable filter elements, e.g., four tunable filter elements 108A-108D, each tunable filter elements 108A-108D in the illustrated exemplary embodiment disposed at a location radially offset from camera tunable filter 118. Although illuminator tunable filter 108 has four (4) tunable filter elements in the illustrated exemplary embodiment, it is to be understood and appreciated that illuminator tunable filter 108 can have fewer than four (4) or more than four (4) tunable filter elements, as suitable for an intended application.

Camera tunable filter 118 is similar to illuminator tunable filter 108, is coplanar with illuminator tunable filter element 108, and is additionally disposed along optical axis 122 such that optical axis 122 intersects cameral tunable filter 118. Camera tunable filter 118 is configured to transmit light with wavelengths within first camera filter bandpass 128 upon receipt of a first camera filter voltage $V_{118A}$. In particular, it is contemplated that, responsive to selection of the magnitude of first camera filter voltage $V_{118A}$, wavelength of fluorescence emitted by fluorophore 12 (shown in FIG. 1) can be selected (i.e. tuned) to suitable for imaging structure of interest within article 10 (shown in FIG. 1). As the magnitude of first camera filter voltage $V_{118A}$ can be adjusted, and first camera filter bandpass 128 thereby changed, without replacing (and/or changing the physical location) of camera tunable filter 118 relative to optical axis 122, selection of structures within article 10 imaged using fluorescence emitted by fluorophore 12 can be achieved relatively quickly compared to imaging devices with movable filters by adjusting magnitude of first camera filter voltage $V_{118A}$, simplifying imaging.

In the illustrated exemplary embodiment camera tunable filter 118 is optically registered with camera 114 along optical axis 122 with illuminator tunable filter 108 arranged perimetrically thereabout, and includes a single tunable filter element. This is for illustration purposes only and non-limiting. Those of skill in the art will readily appreciate in view of the present disclosure that cameral tunable filter 118 can be arranged radially outward of illuminator tunable filter 108, and camera tunable filter 118 can include more than one (1) filter tunable filter element, as suitable for an intended application.

As also shown in FIGS. 3 and 4, imaging device 100 also includes first and second leads, i.e., an illuminator filter lead 132 and a camera filter lead 134. Illuminator filter lead 132 is electrically connected to illuminator tunable filter 108 for applying an illuminator tuning voltage $V_{108}$ to illuminator tunable filter 108. In this respect illuminator filter lead 132 electrically connects illuminator tunable filter 108 to a voltage source 202 (shown in FIG. 5) for applying illuminator tuning voltage $V_{108}$ to illuminator tunable filter 108. When first illuminator tuning voltage $V_{108A}$ (shown in FIG. 3) is applied to illuminator tunable filter 108, illuminator tunable filter 108 transmits light with wavelengths within first illuminator filter bandpass 110 (shown in FIG. 4). When a second illuminator tuning voltage $V_{108B}$ (shown in FIG. 4) is applied to illuminator tunable filter 108, illuminator tunable filter 108 transmits light with wavelengths within second illuminator filter bandpass 112 (shown in FIG. 4). In the illustrated exemplary embodiment each illuminator tunable filter element, i.e. tunable filter elements 108A-108D, is connected electrically in parallel with illuminator filter lead 132.

Camera filter lead 134 is electrically connected to camera tunable filter 118 and is electrically isolated from illuminator filter lead 132. More specifically, camera filter lead 134 electrically connects camera tunable filter 118 to voltage source 202 (shown in FIG. 5) to supply a camera tuning voltage $V_{118}$ with a magnitude that is independent of illuminator tuning voltage $V_{108}$. When a first camera tuning voltage $V_{118A}$ (shown in FIG. 3) is applied to camera tunable filter 118, camera tunable filter 118 transmits light with wavelengths within first camera filter bandpass 128 (shown in FIG. 4). When a second camera tuning voltage $V_{118B}$ (shown in FIG. 4) is applied to camera tunable filter 118, camera tunable filter 118 transmits wavelengths within second camera filter bandpass 130 (shown in FIG. 4).

Independent voltage control allows for selection of a bandpass for camera tunable filter 118 that is independent of illuminator tunable filter 108, and vice versa, enabling electrical reconfiguration of imaging device 100 without structure change (i.e., filter movements or replacements) to imaging device 100. Since the electrical reconfiguration is fast (relative to a mechanical filter swap), wavelength of excitation light provided to fluorophore 12 (shown in FIG. 1) to limit the effect of photobleaching from exposure to the excitation light. As will be appreciated by those of skill in the art in view of the present disclosure, this can enable imaging device 100 to acquire more imagery of structure within article 10 (show in FIG. 1) prior to fluorophore 12 (shown in FIG. 1) becoming unresponsive to excitation illumination than would be possible in imaging devices requiring filter replacements or movements.

Figure 5:
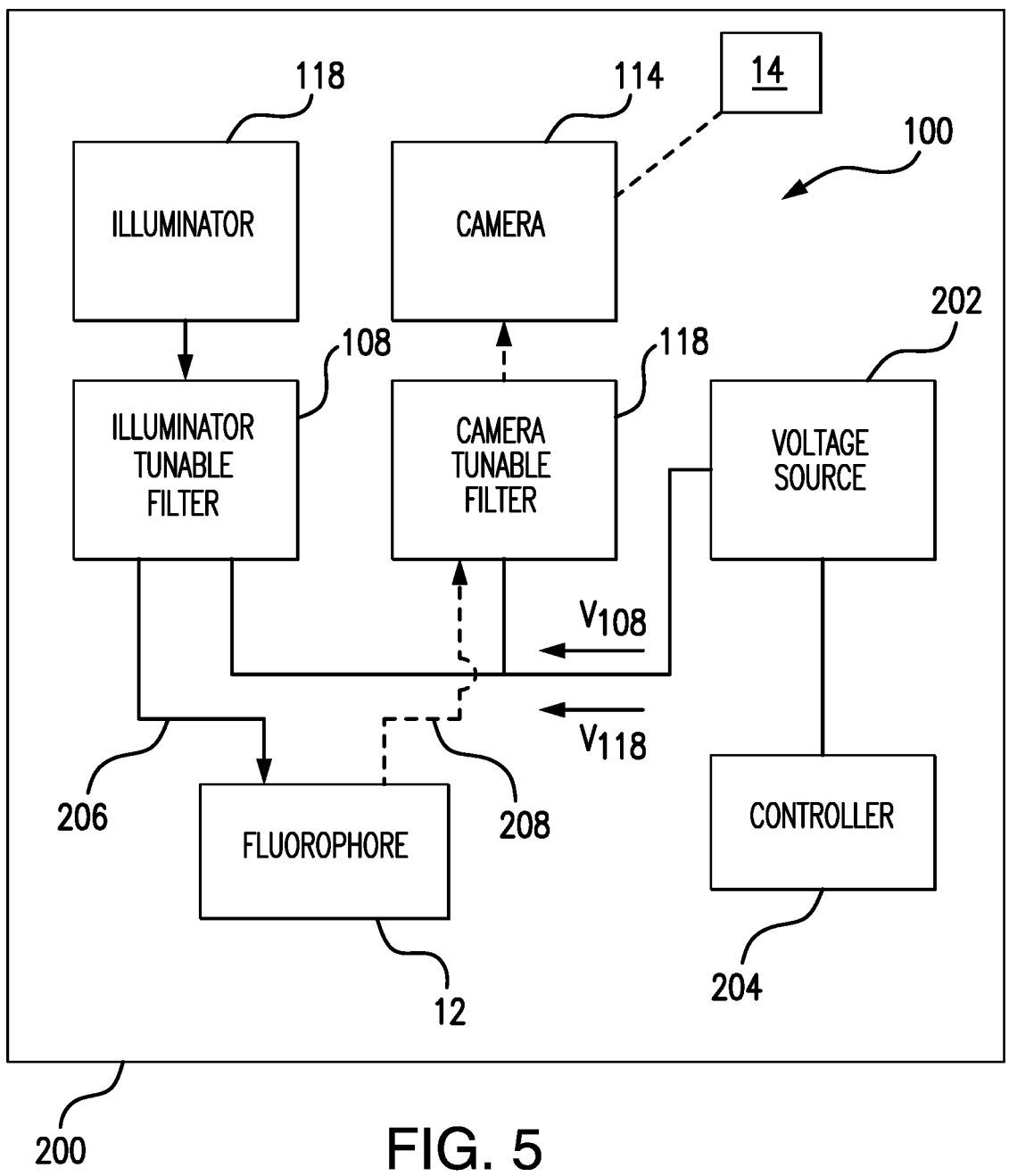
FIG. 5 is a schematic view of the imaging device of FIG. 1, showing a voltage source and controller operatively connected to tunable filter arrangement for selecting bandpass of the illuminator tunable filter and the camera tunable filter, respectively.

With reference to FIG. 5, an imaging arrangement 200 is shown. Imaging arrangement 200 includes imaging device 100, a voltage source 202, and a controller 204. Voltage source 202 is adjustable and is electrically connected to illuminator tunable filter 108 and camera tunable filter 118. More particularly, voltage source 202 is configured to independently apply illuminator tuning voltage $V_{108}$ and camera tuning voltage $V_{118}$. Based on illuminator tuning voltage $V_{108}$ and camera tuning voltage $V_{118}$, excitation illumination 206 is applied to fluorophore 12. Responsive to excitation illumination 206, fluorophore 12 emits fluorescent light 208, which camera tunable filter 118 communicates to camera 114. Camera 114 generates image 14 from fluorescent light emitted by fluorophore 12 and received at camera 114.

Controller 204 is operably connected to illuminator tunable filter 108 and camera tunable filter 118. In the illustrated exemplary embodiment the operable connection is through voltage source 202, controller 204 being arranged therethrough to vary illuminator tuning voltage $V_{108}$ and camera tuning voltage $V_{118}$. Controller 242 can be implemented as software, circuitry, or a combination of circuitry and software, as suited for an intended application, e.g., for implementing an imaging method 300 (shown in FIG. 6). As will be appreciated by those of skill in the art in view of the present disclosure, controller 204 can alternatively (or additionally) include a manual controller.

Figure 6:
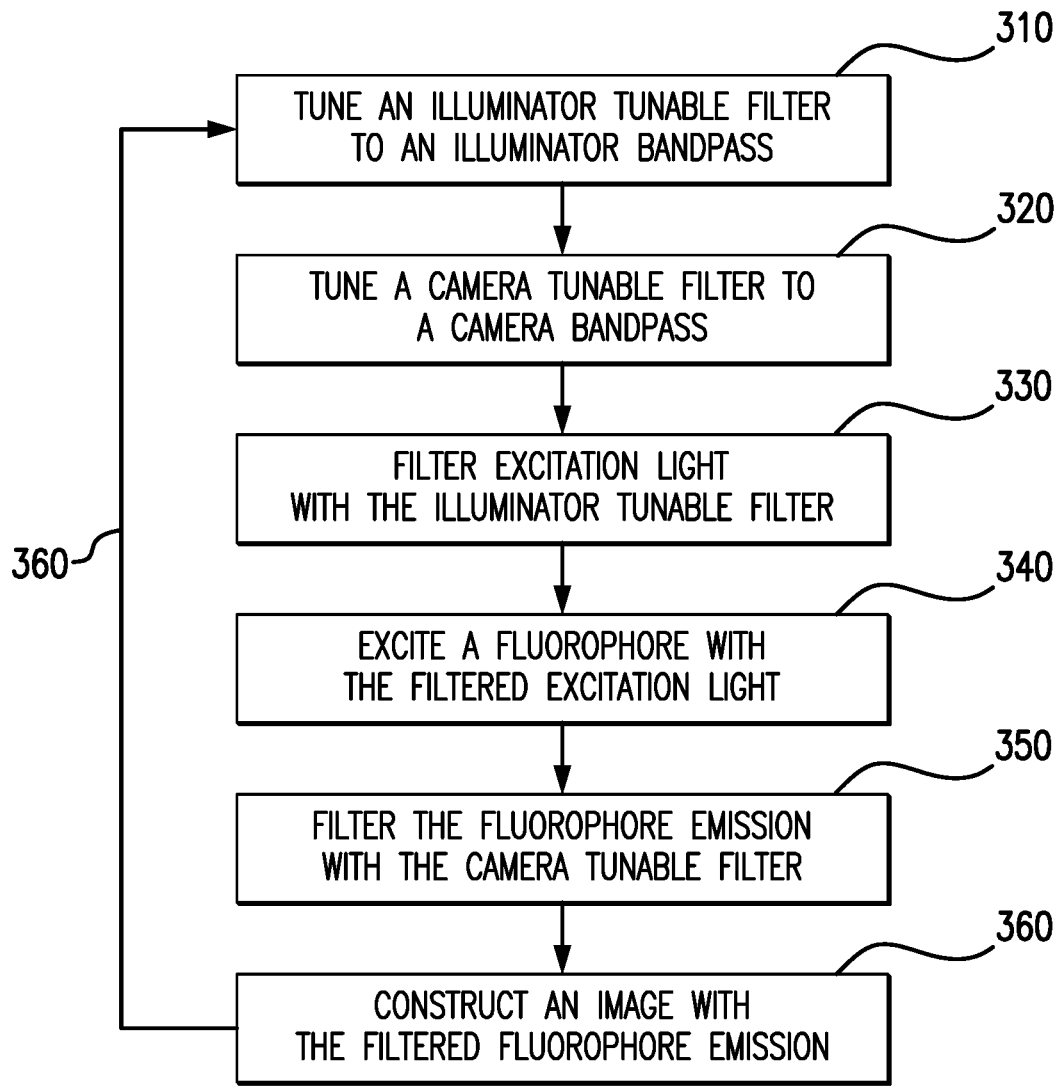
FIG. 6 is a block diagram of an imaging method, showing operations for imaging an article by selecting bandpass of an illuminator tunable filer and camera tunable filter in an exemplary imaging method.

With reference to FIG. 6, imaging method 300 is shown. Imaging method 300 includes tuning an illuminator tunable filter, e.g., illuminator tunable filter 108 (shown in FIG. 1) to an illuminator filter bandpass, e.g., first illuminator filter bandpass 110 (shown in FIG. 3) or second illuminator filter bandpass 112 (shown in FIG. 4), as shown with box 310. Imaging method 300 also includes tuning a camera tunable filter, e.g., camera tunable filter 118 (shown in FIG. 1) to a camera filter bandpass, e.g., first camera filter bandpass 128 (shown in FIG. 3) or second camera filter bandpass 130 (shown in FIG. 4), as shown with box 320. Excitation light, e.g., excitation illumination 206 (shown in FIG. 5), from an illuminator, e.g., from illuminator 116 (shown in FIG. 1), is selectively filtered using the illuminator tunable filter according magnitude of voltage applied to the illuminator tunable filter, as shown with box 330, and transmitted to a fluorophore, e.g., fluorophore 12 (shown in FIG. 1), as also shown with box 330.

The filtered excitation light excites the fluorophore and causes the fluorophore to emit fluorescent light, e.g., fluorescent light 208 (shown in FIG. 5), as shown with box 340. The emitted fluorescent light is transmitted to the camera tunable filter, which filters the emitted fluorescent light to wavelengths within the camera filter bandpass, as shown with box 350. The filtered fluorescent light is thereafter used to construct an image, e.g., image 14 (shown in FIG. 5), of an article, e.g., article 10 (shown in FIG. 1) containing the fluorophore, as shown in FIG. 350. Either (or both) of the illuminator filter bandpass and the camera filter bandpass are tuned electrically, in situ, during imaging the article containing the fluorophore, as shown with bracket 360. It is contemplated that changing the bandpass of either (or both) the camera tunable filter and/or the illuminator tunable filter not require displacing the respective tunable filter relative to the optical axis, simplifying imaging.

In certain embodiment illuminator tunable filter can be tuned to a second illuminator bandpass without optically uncoupling the illuminator tunable filter from the optical axis. The article containing the fluorophore can then again be imaged using light within the first camera bandpass. In accordance with certain embodiments, the camera tunable filter can be tuned to a second camera bandpass without optically uncoupling the camera tunable filter from the optical axis. The article containing the fluorophore can then again be imaged using light within the second camera bandpass. It is also contemplated that, in accordance with certain embodiments, both the illuminator tunable filter can be tuned to a second illuminator bandpass without optically uncoupling the illuminator tunable filter from the optical axis and the camera tunable filter can be tuned to a second camera bandpass without optically uncoupling the camera tunable filter from the optical axis. The article containing the fluorophore can then again be imaged using light within the second camera bandpass.

Fluorescence microscopes typically employ a dichroic mirror at the intersection of a source arm, a specimen arm, and a detector arm in a three-arm arrangement. The source arm generally includes an excitation filter and the detector arm typically includes an emission filter. The excitation filter and the emission filter are typically selected based on the types and quantities of dyes used on the specimen. Since some dyes can require a dye-specific optical setup, i.e., a dye-specific excitation filter, dichroic mirror, and emission filter set, that differ from the optical setup required by others dyes, it can be necessary to switch one or more elements of the optics set when collecting light from different dyes. In some specimens switching must be accomplished prior to the dye photobleaching, which is the tendency of the dye to become less responsive to excitation illumination during imaging.

In embodiments described herein the excitation source and the detector are arranged in the same direction relative to the specimen such that no third arm is utilized. In certain embodiments, a tunable filter arrangement with an illuminator tunable filter and a camera tunable filter is arranged between the light source and the excitation source and the specimen. In accordance with certain embodiments, the illuminator tunable filter and the camera tunable filter can be arranged in a common plane. It is contemplated that the tunable filter arrangement can be fixed relative to the camera and arranged to accommodate dyes with different spectral excitation and emission wavelengths. It is also contemplated that the imaging device, and more particular a fluorescent microscope, can have an optical architecture without a dichroic mirror.

During imaging light from the light source is filtered by the excitation portion of filter mechanism. The filtered light travels through the microscopes tube lens to the microscope objective lens, which focus the filtered light at the dyed specimen. The dye within the specimen fluoresces in response to the incident filtered light, emitting light along the optical axis in the opposite direction towards the detector-emission filter setup. If the specimen contains more than one fluorophore at different spectral responses, the filters can quickly switch to a different excitation-emission combination. Depending on the lighting environment, the detector can integrate over a prolonged time interval or shorter time interval. The fluorophore than fades the fastest would be imaged first.

The methods and systems of the present disclosure, as described above and shown in the drawings, provide for fluoroscopic imaging devices with superior properties including rapid switching between fluorophore excitation and emission collection events. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An imaging device, comprising: a camera; and an illuminator positioned and configured to illuminate an article through an illuminator tunable filter disposed along an optical axis and capture an image of the article through a camera tunable filter arranged along the optical axis, wherein the imaging device does not have a dichroic mirror; wherein the illuminator tunable filter and the camera tunable filter are coplanar with one another.

2. The imaging device as recited in claim 1, wherein one of the illuminator tunable filter and camera tunable filter parametrically surrounds the other of the illuminator tunable filter and camera tunable filter.

3. The imaging device as recited in claim 1, wherein the wherein one of the illuminator tunable filter and camera tunable filter has a plurality of filter elements.

4. The imaging device as recited in claim 1, further comprising a lead electrically connected to one of the illumination tunable filter and the camera tunable filter.

5. The imaging device as recited in claim 1, wherein at least one of the illuminator tunable filter and the camera tunable filter transmits light with wavelength in the first bandpass upon receipt of a first voltage, wherein the tunable filter arrangement transmits light with wavelength in the second bandpass upon receipt of a second voltage.

6. The imaging device as recited in claim 1, further comprising a voltage source electrically connected to at least one of the illuminator tunable filter and the camera tunable filter.

7. The imaging device as recited in claim 1, further comprising a camera tunable filter lead, the camera tunable filter lead being electrically connected to the camera tunable filter and electrically isolated from the illuminator tunable filter.

8. The imaging device as recited in claim 1, further comprising a stage with an article containing a fluorophore optically coupled to at least one of the illuminator tunable filter and the camera tunable filter.

9. The imaging device as recited in claim 1, further comprising:

a controller operatively connected to the tunable filter arrangement,
wherein the controller is configured to select bandpass of the tunable filter arrangement without optically uncoupling the illuminator tunable filter and the camera tunable filter from the optical axis.

10. An imaging arrangement, comprising:
an imaging device as recited in claim 1;
an ocular lens arranged along the optical axis;
an objective lens optically coupled to the ocular lens by the optical axis; and
a tunable filter arrangement including the illuminator tunable filter and the camera tunable filter, the tunable filter arrangement optically coupled to the ocular lens and the objective lens and arranged between the ocular lens and objective lens,
wherein the illuminator tunable filter and camera tunable filter each have a first bandpass and at least one second bandpass to image an article containing a fluorophore with a camera and illuminator disposed along the optical axis without an intervening dichroic mirror.

11. The imaging arrangement as recited in claim 10, wherein the camera is optically coupled to the ocular lens by the illuminator tunable filter.

12. The imaging arrangement as recited in claim 10, wherein the illuminator is optically coupled to the ocular lens by the tunable filter arrangement.

13. The imaging arrangement as recited in claim 10, wherein the camera tunable filter is coplanar with the illuminator tunable filter, and further comprising:
a first lead electrically connected to the illuminator tunable filter; and
a second lead electrically connected to the camera tunable filter, the second lead electrically isolated from the illuminator tunable filter for coincidently applying different voltages to the illuminator tunable filter and camera tunable filter.

14. An imaging method, comprising:
at an imaging device having a camera and an illuminator positioned and configured to illuminate an article through an illuminator tunable filter disposed along an optical axis and capture an image of the article through a camera tunable filter arranged along the optical axis, wherein the imaging device does not have a dichroic mirror,
tuning the illuminator tunable filter to a first illuminator bandpass;
tuning the camera illuminator tunable filter to a first camera bandpass;
exciting a fluorophore using light from within first illuminator bandpass; and
imaging an article containing the fluorophore using light within the first camera bandpass;
further comprising arranging the illuminator and the camera tunable filters to be coplanar.

15. The imaging method as recited in claim 14, further comprising:
tuning the illuminator tunable filter to a second illuminator bandpass without optically uncoupling the illuminator tunable filter from the optical axis; and
imaging the article containing the fluorophore using light within the first camera bandpass.

16. The imaging method as recited in claim 14, further comprising:
tuning the camera tunable filter to a second camera bandpass without optically uncoupling the camera tunable filter from the optical axis; and imaging the article containing the fluorophore using light within the second camera bandpass.

17. The imaging method as recited in claim 14, further comprising:
tuning the illuminator tunable filter to a second illuminator bandpass without optically uncoupling the illuminator tunable filter from the optical axis;
tuning the camera tunable filter to a second camera bandpass without optically uncoupling the camera tunable filter from the optical axis; and
imaging the article containing the fluorophore using light within the second camera bandpass.

18. The imaging arrangement of claim 10, wherein the imaging device is configured to:
tune the illuminator tunable filter to the first illuminator bandpass;
tune the camera illuminator tunable filter to the first camera bandpass;
excite a fluorophore using light from within the first illuminator bandpass; and
image an article containing the fluorophore using light within the first camera bandpass.

\* \* \* \* \*